(12) United States Patent
Couleur et al.

(10) Patent No.: US 11,349,396 B2
(45) Date of Patent: May 31, 2022

(54) INTERLEAVED PULSE FREQUENCY MODULATION MODE FOR A MULTI-PHASE BUCK CONVERTER USING COUPLED INDUCTORS

(71) Applicant: Apple Inc., Cupertino, CA (US)

(72) Inventors: Michael Couleur, Munich (DE); Shawn Searles, Austin, TX (US); Nikola Jovanovic, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/747,435

(22) Filed: Jan. 20, 2020

(65) Prior Publication Data

US 2021/0226536 A1 Jul. 22, 2021

(51) Int. Cl.
*H02M 3/158* (2006.01)
*G06F 1/26* (2006.01)

(52) U.S. Cl.
CPC .......... *H02M 3/1584* (2013.01); *G06F 1/266* (2013.01); *H02M 3/1586* (2021.05)

(58) Field of Classification Search
CPC ....... H02M 3/1584; H02M 2003/1586; H02M 3/1586; G06F 1/266
See application file for complete search history.

(56) References Cited

U.S. PATENT DOCUMENTS

| | | |
|---|---|---|
| 9,774,259 B1 | 9/2017 | Ikriannikov et al. |
| 10,256,728 B1 | 4/2019 | Couleur et al. |
| 2007/0085520 A1* | 4/2007 | Ho ...................... H02M 3/1588 323/282 |
| 2015/0280555 A1 | 10/2015 | Koertzen |
| 2016/0013713 A1* | 1/2016 | Li ......................... H02M 3/158 323/312 |
| 2018/0183332 A1* | 6/2018 | Herzer ................ H02M 3/1584 |
| 2019/0273439 A1 | 9/2019 | Desai et al. |

* cited by examiner

*Primary Examiner* — Rafael O De Leon Domenech
(74) *Attorney, Agent, or Firm* — Kowert, Hood, Munyon, Rankin & Goetzel, P.C.; Erik A. Heter

(57) ABSTRACT

A method and apparatus for operating a DC-DC converter in an interleaved (or rotating) pulse frequency modulation (PFM) mode is disclosed. A DC-DC converter includes a number of inductor pairs, with each inductor coupled to a corresponding pulse control circuit. During a cycle in which one of the pulse control circuits sources a current pulse through its respectively coupled inductor, a second pulse control circuit coupled to the other inductor of the pair determines if a voltage on its output node (e.g., where it is coupled to its inductor) is less than a threshold voltage. Responsive to determining that the voltage on its output node is less than the threshold, the second pulse control circuit activates a current path through the other inductor of the pair.

20 Claims, 10 Drawing Sheets

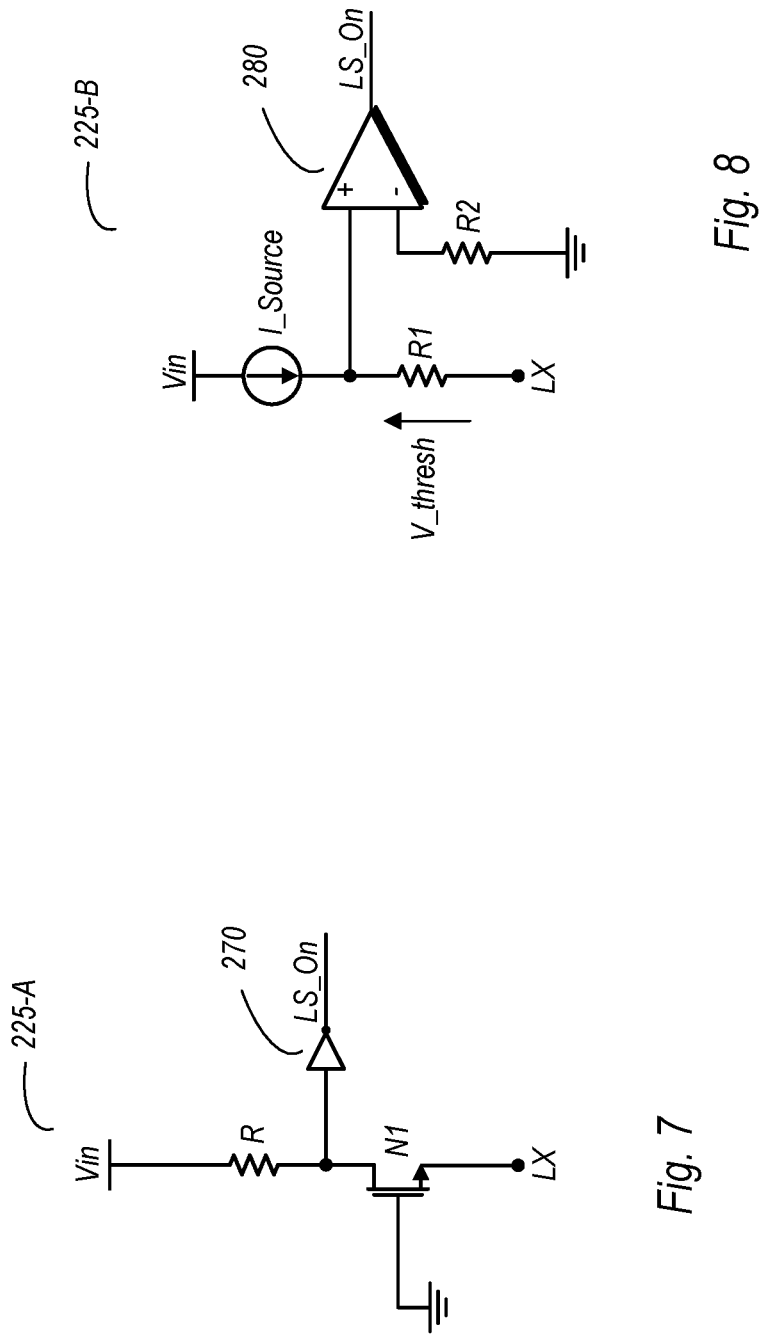

INTERLEAVED PULSE FREQUENCY MODULATION MODE FOR A MULTI-PHASE BUCK CONVERTER USING COUPLED INDUCTORS

BACKGROUND

Technical Field

This disclosure relates to electronic circuits, and more particularly, to DC-DC converters.

Description of the Related Art

Computing systems may include one or more systems-on-a-chip (SoC), each of which may integrate a number of different functions onto a single integrated circuit. Various SoCs and/or various functional blocks on a given SoC may utilize power signals of different voltage levels. Since computing systems may include a single power source with a given output voltage level, one or more voltage converters or voltage regulators may be used to generate the power signals of different voltage levels.

Voltage regulation circuits implemented in a given computing system may be designed according to one of various design styles and types. Types of circuits for converting a DC power signal with a first voltage to a DC power signal with a second voltage include linear regulators and switching regulators. Buck converters, sometimes also referred to as buck regulators, are one example of a switching regulator.

SUMMARY

A method and apparatus for operating a DC-DC converter in an interleaved (or rotating) pulse frequency modulation (PFM) mode. In one embodiment, a DC-DC converter includes a number of inductor pairs, with each inductor coupled to a corresponding pulse control circuit. During a cycle in which one of the pulse control circuits sources a current pulse through its respectively coupled inductor, a second pulse control circuit coupled to the other inductor of the pair determines if a voltage on its output node (e.g., where it is coupled to its inductor) is less than a threshold voltage. Responsive to determining that the voltage on its output node is less than the threshold, the second pulse control circuit activates a current path through the other inductor of the pair.

For each pair of coupled inductors, their respectively coupled ones of the pulse control circuits are arranged to source current pulses in opposite phases with one another. However, the coupled inductors may share their respective magnetic fields with one another.

In one embodiment, a mode control circuit of the DC-DC converter may cause, under certain operating conditions, a reduction in the number of pulse control circuits that source a current pulse in a given cycle. Moreover, the mode control circuit may alternate which of the pulse control circuits source a current pulse in any particular cycle. This operation may occur during a pulse frequency modulation (PFM) mode in which of the frequency at which current pulses are sourced may vary with current demanded by a load circuit coupled to receive the output voltage from the DC-DC converter, and thus the ability of the latter to maintain the desired output voltage.

BRIEF DESCRIPTION OF THE DRAWINGS

The following detailed description makes reference to the accompanying drawings, which are now briefly described.

FIG. 7 is a schematic diagram of a first embodiment of a voltage detection circuit.

FIG. 8 is a schematic diagram of a second embodiment of a voltage detection circuit.

Figure 1:
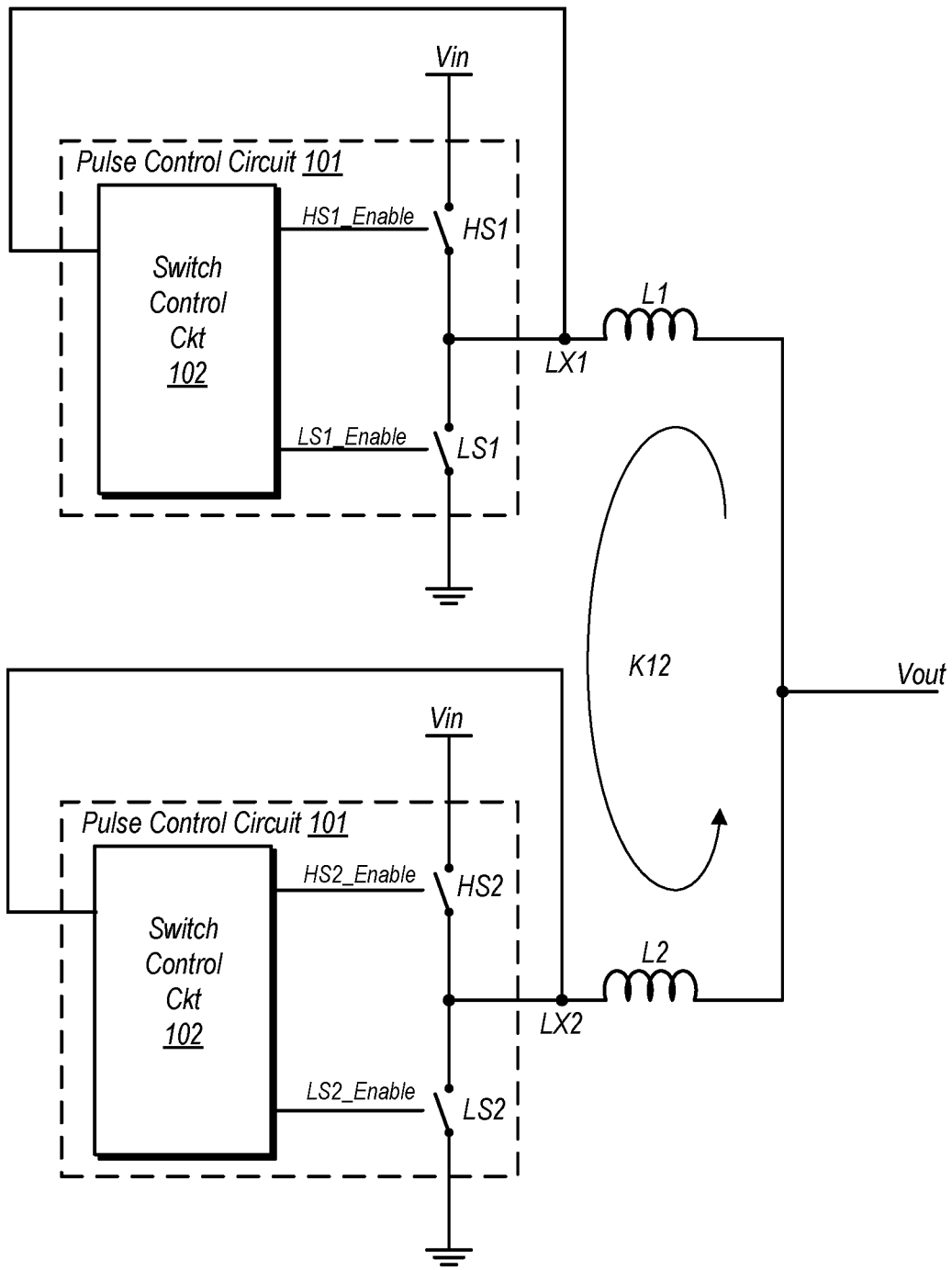
FIG. 1 is a simplified schematic diagram of a portion of one embodiment of a DC-DC converter.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Voltage conversion circuits, and more particularly, DC-DC converters, may be found in many electronic systems for providing a supply voltage at a specified level to one or more circuits in, e.g., an integrated circuit (IC). Buck converters are one type of voltage conversion circuit that may be used to generate a power signal with a given voltage level. Buck converters receive an input power signal (Vin) and generate an output supply voltage (Vout) with a particular voltage level. To reduce the voltage level, for example, of Vin to a desired voltage level on Vout, a buck converter may couple Vin to Vout for given periods of time via a switching device, such as a transistor. Some voltage regulation systems may include multiple switching devices for producing a Vout power signal, with each switching device enabled during a different time phase, which may produce a more consistent voltage level on Vout and may be capable of responding more quickly to changes in current demand from the ICs.

A buck regulator may include a control circuit that generates a signal that enables and disables the transistor (which may alternatively be referred to as a switch) for the given amounts of time. Components such as, e.g., capacitors and inductors may be used to provide charge storage during the time periods in which the transistor is off. The voltage level of Vout may be dependent upon an average amount of time that the transistor is on versus off, referred to as the "on time." Switching may be conducted in different modes, including a pulse frequency modulation (PFM) and a pulse width modulation (PWM). In the PFM mode, the frequency at which pulses are generated may be modulated, and there may be gaps of time between one pulse and the next, particularly when the current demanded (also referred to as the demand current) by the load circuit is low. When the demand current decreases in the PFM mode, the spacing between successive pulses may increase. On the other hand, when the demand current increases when operating in the PFM mode, the spacing between successive pulses is reduced. At some point, successive pulses may begin to run together and form a longer, continuous pulse. At this point, the circuit may be considered to be operating in the PWM mode. As demand current increases, the length of the pulses may become longer.

Some buck converters may employ pairs of coupled inductors. For a given pair of coupled inductors, their respective magnetic fields may be shared. Pulse control circuits for a given pair of coupled inductors source current pulses through their respectively coupled inductor on opposite phases. For example, consider first and second inductors of a coupled pair and their corresponding pulse control circuits. A corresponding pulse control circuit may source a current pulse through the first inductor on first phase, while the other pulse control circuit may source a current pulse through the second inductor during a second, opposite phase (e.g., 180° out of phase with the first phase). If a buck converter includes a number of inductor pairs, a subset of the group of pulse control circuits source current pulses through their respective inductors during a first phase, while another subset of the pulse control circuits source current pulses during a second, opposite phase. Advantages of utilizing the coupled inductor configuration may include area/space savings on the medium upon which the buck converter is implemented, and improvements in transient response (e.g., sudden changes to current demand a load circuit).

As noted above, when demand current is low, a DC-DC converter (and thus the pulse control circuits thereof may operate in the PFM mode. For DC-DC converters having multiple inductors (and thus multiple pulse control circuits), there may be times when the demand current is low enough that current sources can be pulsed through fewer than the full set of inductors, and even through only one of the inductors. The present disclosure contemplates a DC-DC converter in which, for low demand currents, only a single pulse control circuit sources a current pulse at a given time. Furthermore, a control circuit may cause a rotation through the pulse control circuits so that, over time, each of them sources a current pulse. This mode may be referred to herein as a rotating PFM mode.

The present disclosure is further directed to DC-DC converters that use coupled inductors. In such DC-DC converters, the inductors are arranged in pairs. The inductors of a given pair, during operation, are electromagnetically coupled to one another, with the coupling described by a coupling coefficient K. Each of the inductors of the DC-DC converter is coupled to a corresponding pulse control circuit. Moreover, the present disclosure contemplates a DC-DC converter that utilizes the rotating PFM mode discussed above in conjunction with the coupled inductor configuration. The use of coupled inductors can complicate efforts to implement the rotating PFM. In particular, when a current source is pulsed through a particular inductor, it is possible that a voltage on a node of the other inductor of the coupled pair falls to a negative value. When this value is sufficiently negative, a diode voltage of a transistor/switch (which may be referred to as a low side switch) coupled to that node may be exceeded, causing that device to act as a diode that is turned on. Since this behavior is undesirable, the present disclosure contemplates an apparatus and method which cause the low side switch to be activated to provide a current path through the coupled inductor to, e.g., a ground node, thereby preventing the device from acting as a diode and preventing the voltage on the node from falling to a negative value. Various embodiments of such a DC-DC converter are now discussed in further detail.

Turning now to FIG. 1, a simplified schematic diagram of a portion of one embodiment of a DC-DC converter is shown. In the embodiment shown, circuit 11 implements a portion of a DC-DC converter that is implemented using coupled inductor. Circuit 11 includes inductors L1 and L2, which are arranged to share electromagnetic fields during operation, and have a coupling factor K12. Inductor L1 is coupled to a first instance of a pulse control circuit 101, while inductor L2 is coupled to another instance of a pulse control circuit 101. The inductors L1 and L2 are both coupled to an output voltage node, Vout, from which the desired supply voltage generated by the corresponding DC-DC converter is provided.

The pulse control circuit coupled to L1 includes a first switch, HS1, which is coupled between an input voltage node, Vin, and a node LX1 on one terminal of L1. This instance of pulse control circuit 101 also includes a second switch, LS1, coupled between LX1 and ground. The instance of pulse control circuit 101 coupled to L2 includes similar switches, HS2 and LS2, coupled to node LX2. Switches HS1 and HS2 may be referred to as high side switches, while switches LS1 and LS2 may be referred to as low side switches. Each of the pulse control circuits 101 includes a corresponding instance of a switch control circuit 102 which controls activation and deactivation of its correspondingly coupled switches.

A given one of the pulse control circuits 101 may source a current pulse by activating its corresponding high side switch HS1 (cause by providing a signal on the node HS1 ENABLE at the appropriate level). When the high side switch HS1 is activated (e.g., closed), node LX1 is DC coupled to Vin, thereby causing its voltage to rise and current to be sourced through L1. The switch may remain on until, e.g., the current sourced through L1 reaches a desired peak value. Thereafter, the corresponding switch control circuit, which may receive a voltage from LX1 as a feedback voltage, may cause deactivation of HS1, and may further cause activation of the low side switch LS1 by providing the appropriate signal level on node LS1_ENABLE. The low side switch LS1 may remain active until the current through the inductor (and thus through LS1) falls to a predetermined value (e.g., zero). Thereafter LS1 may be opened/deactivated.

It is noted that when circuit 11 (and a buck converter utilizing the same) is operating in a PWM mode, LX2 does not typically fall such that the diode voltage of LS2 is exceeded, as current pulses may be sourced through both inductors of a coupled pair concurrently.

Since L1 and L2 are arranged as coupled inductors with a coupling factor of K12, the sourcing of a current pulse through L1 has an effect on the voltage across L2. In particular, the voltage present on LX2 may be affected by the changing voltage through L1. In some instances, the voltage on LX2 may become negative. Since switches such as LS2 may be implemented as transistors, these transistors may have a diode voltage between their respective gate and drain terminals. Thus, if the voltage LX2 falls far enough, a threshold voltage (which may be referred to as the diode voltage of the device) associated with LS2 may be crossed. To state another way, the voltage different between LS2 Enable and LX2 may exceed the diode voltage of a device that implements LS2. Thus, when this threshold is crossed by LX2, switch LS2 may act as a forward biased diode, with LS2 Enable being the anode and LX2 being the cathode. However, the circuit as shown in FIG. 1 may prevent this condition from occurring by activating LS2 should the voltage on LX2 fall below a particular threshold. When LS2 is turned on (closed) during this condition, a current path through L2 to ground is activated, and thus voltage on LX2 is pulled toward ground. Since LS2 is active (closed) at this time, it is not acting as a forward-biased diode. Meanwhile, when LS2 is closed, the voltage on LX2 is pulled toward ground. If, on the other hand, LX2 does not fall below the threshold which would cause a diode voltage to be present across LS2, the switch may remain open.

Similar operation may occur when the pulse control circuit coupled to inductor L2 sources a current pulse during PFM operation. A current pulse may be sourced through L2 through the activation (closing) of the high side switch HS2. Meanwhile, if LX1 falls below a certain threshold, thereby causing the presence of a diode voltage between LS1_Enable and LX1, the correspondingly coupled pulse control circuit 101 may cause LS1 to be closed to activate the current path through L1 to ground. Otherwise, if LX1 does not fall sufficiently to cause the diode voltage to be present between LS1_Enable and LX1, LS1 may remain open while a current pulse is sourced through L2.

Figure 2:
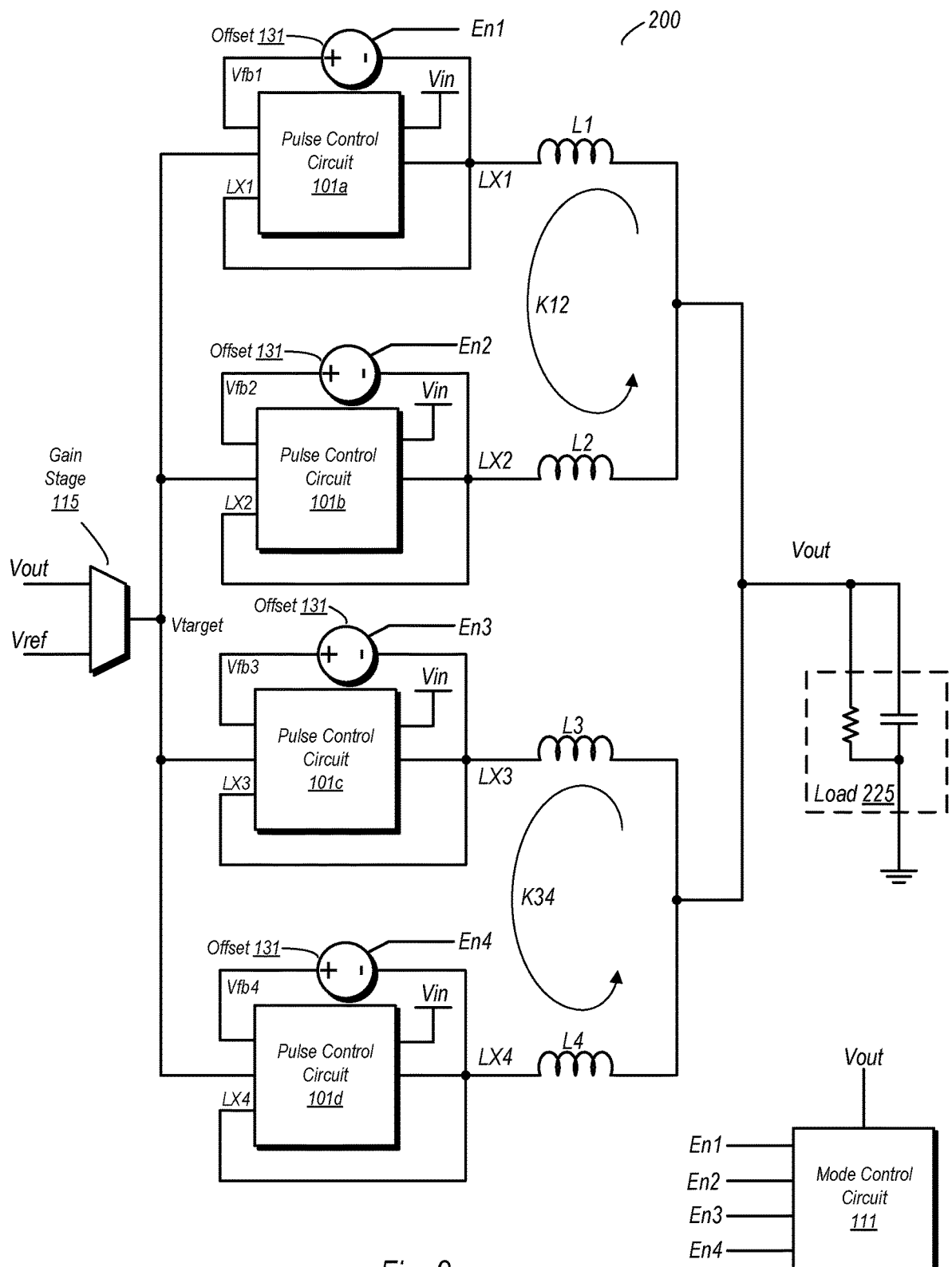
FIG. 2 is a diagram illustrating one embodiment of a DC-DC converter.

FIG. 2 is a diagram illustrating one embodiment of a DC-DC converter. In the embodiment shown, DC-DC converter 200 is a buck converter configured to receive and input voltage, Vin, and provide an output voltage, Vout that is less than the input voltage. The output voltage is provided to a load circuit 225, which is represented here by a resistor and a capacitor, but can include virtually any type of circuitry.

DC-DC converter 200 in the illustrated embodiment includes two pairs of coupled inductors. A first inductor pair includes inductors L1 and L2, having a coupling factor of K12. A second inductor pair includes inductors L3 and L4, which have a coupling factor K34. Although only two pairs of inductors are shown here, embodiments are possible and contemplated having a different number of inductor pairs (e.g., 3 pairs, 4 pairs, etc.). Each of the inductors are coupled to an output voltage node, Vout, upon which the desired voltage is to be provided. The inductors in one embodiment each have substantially the same inductance values, and correspondingly, the coupling factors from one pair to another may be substantially the same. Each of the inductors in the embodiment shown is coupled to a corresponding pulse control circuit 101. More particularly, L1 is coupled to pulse control circuit 101a, L2 is coupled to pulse control circuit 101b, L3 is coupled to pulse control circuit 101c, and L4 is coupled to pulse control circuit 101d.

In the embodiment shown, DC-DC converter 200 includes a gain stage 115. Gain state 115 is coupled to receive as inputs the output voltage, Vout, of the DC-DC converter 200, and a reference voltage that is indicative of a desired output voltage. Responsive to these two inputs, gain stage 115 may output a target voltage, Vtarget, that is provided to each of the pulse control circuits 101. The use of this target voltage is discussed in further detail below. Gain stage 115 may be implemented using any suitable circuitry, such as an amplifier that generates the target voltage based on a difference of the inputs provided thereto.

DC-DC converter 200 in the illustrated embodiment also includes a number of offset circuits 131. Each of the offset circuits 131 is implemented in a feedback path between an output and a feedback input of a correspondingly coupled one of pulse control circuits 101. When enabled, a given offset circuit 131 may apply an offset voltage to the feedback signal (e.g., to Vfb1 input into pulse control circuit 101a) that may inhibit the corresponding pulse control circuit 101 from sourcing a current pulse. Additional details of this operation will be discussed below in reference to FIG. 3. When no offset voltage is applied, the feedback voltage Vfb may be equivalent to the voltage on the output node of the pulse control circuit (e.g., Vfb1=LX1 when no offset applied).

Application of a particular offset voltage may be done under the control of mode control circuit 111. An offset voltage may be applied to a feedback signal associated with a selected one of the pulse control circuits 101 by asserting a corresponding enable signal. For example, mode control circuit 111 may assert enable signal En1 to cause an offset voltage to be applied to feedback voltage Vfb1 that is input into pulse control circuit 101a. Responsive to receiving the feedback voltage with the offset applied, pulse control circuit 101a may be inhibited from sourcing a current pulse through inductor L1.

As noted above, DC-DC converter 200 may at times operate in a rotating PFM mode. In particular, when the current demand is low enough and fewer current pulses are required to maintain the desired output voltage on Vout, operation in the rotating PFM mode may be conducted. The operation in this mode may be performed under the control of mode control circuit 111, which is coupled to receive the output voltage, Vout. During operation in the PWM mode or at certain points of the PFM mode (e.g., when there is no spacing between the pulses), mode control circuit 111 may hold each of the enable signals in a de-asserted state. Accordingly, the feedback voltages provided to each of the pulse control circuits 101 may be provided without any offsets. When this is the case, two or more pulse control circuits 101 may source current pulses concurrent with one another. For example, pulse control circuits 101a and 101c may concurrently source current pulses through inductors L1 and L3 respectively. However, in the rotating PFM mode, when fewer current pulses may be used to maintain the desired output voltage, mode control circuit 111 may begin selectively asserting enable signals, and thereby selectively inhibiting one or more of the pulse control circuits 101 from sourcing current pulses. By selectively inhibiting various ones of the pulse control circuits 101 from sourcing current pulses, mode control circuit 111 may in effect select which one(s) of the pulse control circuits 101 sources a current pulse in any given cycle.

In one example, mode control circuit may, in one cycle, assert enable signals En2, En3, and En4, while holding En1 de-asserted. Accordingly, pulse control circuit 101a may source a current pulse during this cycle. Pulse control circuits 101b, 101c, and 101d may be inhibited from sourcing current pulses at least in part due to the offset voltage provided to each of their respectively received feedback signals. On a next cycle, mode control circuit may assert En1 and de-assert En2 (while the other two remain unchanged), thereby enabling pulse control circuit 101b to source a current pulse through L2 while the others are inhibited. This type of operation may be repeated to allow pulse control circuit 101c to source a current pulse through L3 on a next cycle, and source a current pulse through L4 by pulse control circuit 101d on a cycle after that. Accordingly, mode control circuit 111 may cycle through the various pulse control circuits 101 such that, over a number of cycles (e.g., 4) each of them source one current pulse. Furthermore the spacing between these pulses may be such the output voltage can be maintained with fewer pulses from any of the pulse control circuits. As noted above with regard to FIG. 1, whenever a given one of the pulse control circuits 101 sources a current pulse through one inductor of a pair, its counterpart coupled to the other inductor of the pair may monitor the voltage on the inductor to determine if its corresponding low side switch is to be closed and a current path is to be activated to prevent that switch from acting as a diode.

Figure 3:
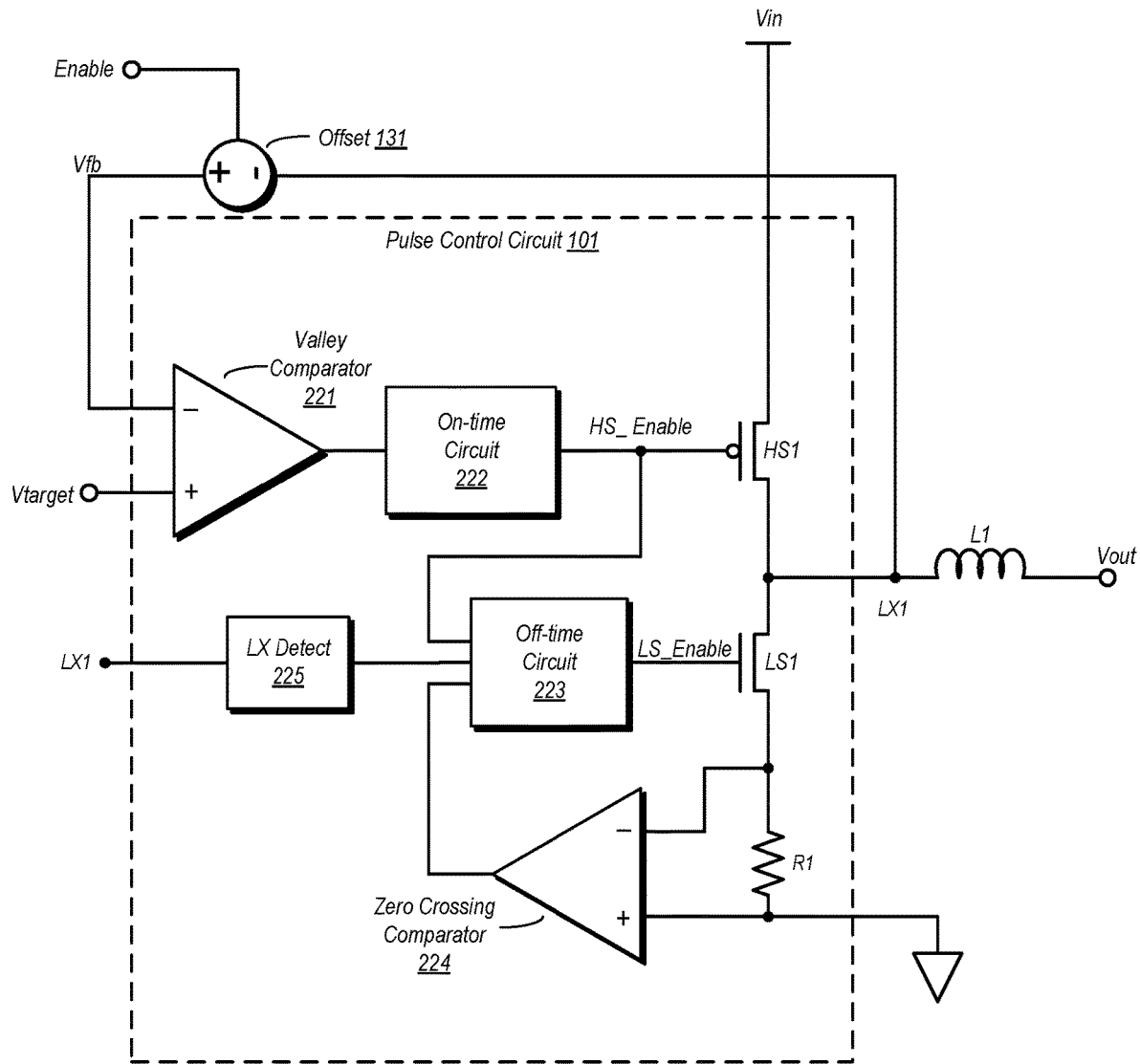
FIG. 3 is a diagram illustrating one embodiment of a pulse control circuit.

FIG. 3 is a diagram illustrating one embodiment of a pulse control circuit 101 and its relationship with an illustrated instance of an offset circuit 131. In the embodiment shown, pulse control circuit includes a valley comparators 221, which is coupled to receive a feedback voltage Vfb and a target voltage, Vtarget, which was discussed above in reference to FIG. 2. The output of valley comparator 221 is provided to an On-time circuit 222, which in turn is configured to output the active low HS_Enable. The HS_Enable signal is provided to the gate terminal of transistor HS1, which can alternatively be referred to as the high side switch for pulse control circuit 101. Additionally, the HS_Enable signal is also provide as an input to Off-time circuit 223. Off-time circuit 223 is also coupled to receive an input from LX detect circuit 225, which is coupled to receive the voltage on node LX1. Off-time circuit 223 is also coupled to receive another input signal from the output of zero-crossing comparator 224. The output of Off-time circuit 223 is the active high LS_Enable signal that is provided to the gate terminal of transistor LS1 (alternatively referred to as the low side switch). The source terminal of LS1 is coupled to resistor R1, which is also provided to one of the inputs of zero-crossing comparator 224. The other input to zero crossing comparator 224 is coupled to a ground node. The respective drain terminals of LS1 and HS1 are coupled to inductor L1 at node LX1. The other terminal of inductor L1 is coupled to the output voltage node, Vout.

Although not explicitly shown here, On-time circuit 222 and Off-time circuits 223 may, in some embodiments, receive additional signals. Such signals may include mode control signals to control whether pulse control circuit 101 operates in PFM or PWM mode.

Offset circuit 131 in this embodiment is coupled in a feedback path between LX1 and the feedback voltage node, Vfb, which is coupled to an input of valley comparators 221.

When the Enable signal is asserted to offset circuit 131, an offset voltage is added to the voltage present on LX1, with the sum of these voltages being provided as the feedback voltage on node Vfb. When the enable signal is not asserted to offset circuit 131, the feedback voltage on node Vfb is substantially equal to the voltage present on LX1. Offset circuit 131 may be implemented using any suitable circuitry that can sum two voltages together, and may also include voltage generation circuitry to generate the offset voltage.

Valley comparator 221 is configured to perform a comparison between the voltages present on the Vtarget and Vfb. If the voltage level on Vfb falls below that of Vtarget, valley comparator 221 asserts an output signal. Upon detecting the assertion of this output signal, On-time circuit 222 may assert the HS_Enable signal. When HS_Enable is asserted, transistor HS1, the high side switch, is activated. When HS1 is active, a current path is provided between LX1 and Vin, and thus a pulse of current is sourced through inductor L1. The assertion of HS_Enable is also detected by Off-time circuit 223, which may respond by outputting the LS_Enable signal as a low. This causes transistor LS1, the low side switch, to remain inactive.

Sourcing of a current pulse may contribute to a rising value of the feedback voltage present on Vfb. When Vfb rises sufficiently to a point at which it is greater than Vtarget, valley comparator 221 may de-assert its output signal. After a certain amount of time has elapsed, On-time circuit 222 may de-assert HS_Enable by outputting this signal as a high. In some modes of operation (e.g., the PFM mode) and responsive to the de-assertion of HS_Enable, HS1 may be deactivated. If no offset voltage is provided by offset circuit 131, On-time circuit 222 may assert the HS_Enable signal to activate HS1 responsive to the next assertion of the output signal from valley comparators 221. If the offset voltage is provided by offset circuit 221, valley comparators 221 may be prevented from asserting its output signal. This may in turn prevent HS_Enable from being driven low and activating HS1. Accordingly, adding the offset voltage to the feedback voltage present on Vfb may be used to inhibit pulse control circuit 101 from sourcing a current pulse.

Responsive to On-time circuit 222 driving HS_Enable high to terminate a sourced current pulse, Off-time circuit 223 may drive LS_Enable high. This in turn may cause activation of the low side switch, transistor LS1. This may create a current path to ground, through L1, LS1, and resistor R1. Zero-crossing comparator 224 in the embodiment shown effectively measures a current through LS1, which is indicated by the voltage difference on the two terminals of R1. When the current through LS1 reaches a threshold value, zero-crossing comparator 224 asserts its output signal, with this assertion detected by Off-time circuit 223. This may cause Off-time circuit 223 to de-assert LS_Enable, thereby deactivating LS1.

Off-time circuit 223 may also assert LS_Enable responsive to an assertion of an output signal from LX Detect circuit 225. In the embodiment shown, LX Detect circuit 22 monitors the voltage on the node LX1. In at least some modes of operation, LX Detect circuit may assert its output signal responsive to LX1 falling below a certain threshold voltage. In the absence of the LX Detect circuit 225, the falling of LX1 may cause the voltage difference between LS_Enable and LX1 to meet or exceed a diode voltage of LS1. This could cause LS1 to act as a forward-biased diode, with LS_Enable being the anode, and LX1 being the cathode. This operation may be undesirable in at least some modes. Accordingly, responsive to LX1 Detect circuit 221 asserting its output signal, Off0time circuit 223 may assert LS1_Enable as a low, thereby activating LS1 and thus activating a current path through L1 to ground. This operation may occur in at least the rotating PFM mode as discussed above, when a counterpart pulse control circuit 101 (associated with a coupled inductor) is sourcing a current pulse. For example, if L1 is one of a coupled inductor pair with inductor L2 (e.g., as shown in FIG. 2), when the pulse control circuit 101 associated with L2 is sourcing a current pulse during operation in the rotating PFM mode, Off-time circuit 223 may assert the active low LS_Enable signal if LX Detect circuit 225 detects that LX1 has fallen below the threshold value. Various embodiments of an LX detect circuit are discussed below in reference to FIGS. 7 and 8.

Figure 4:
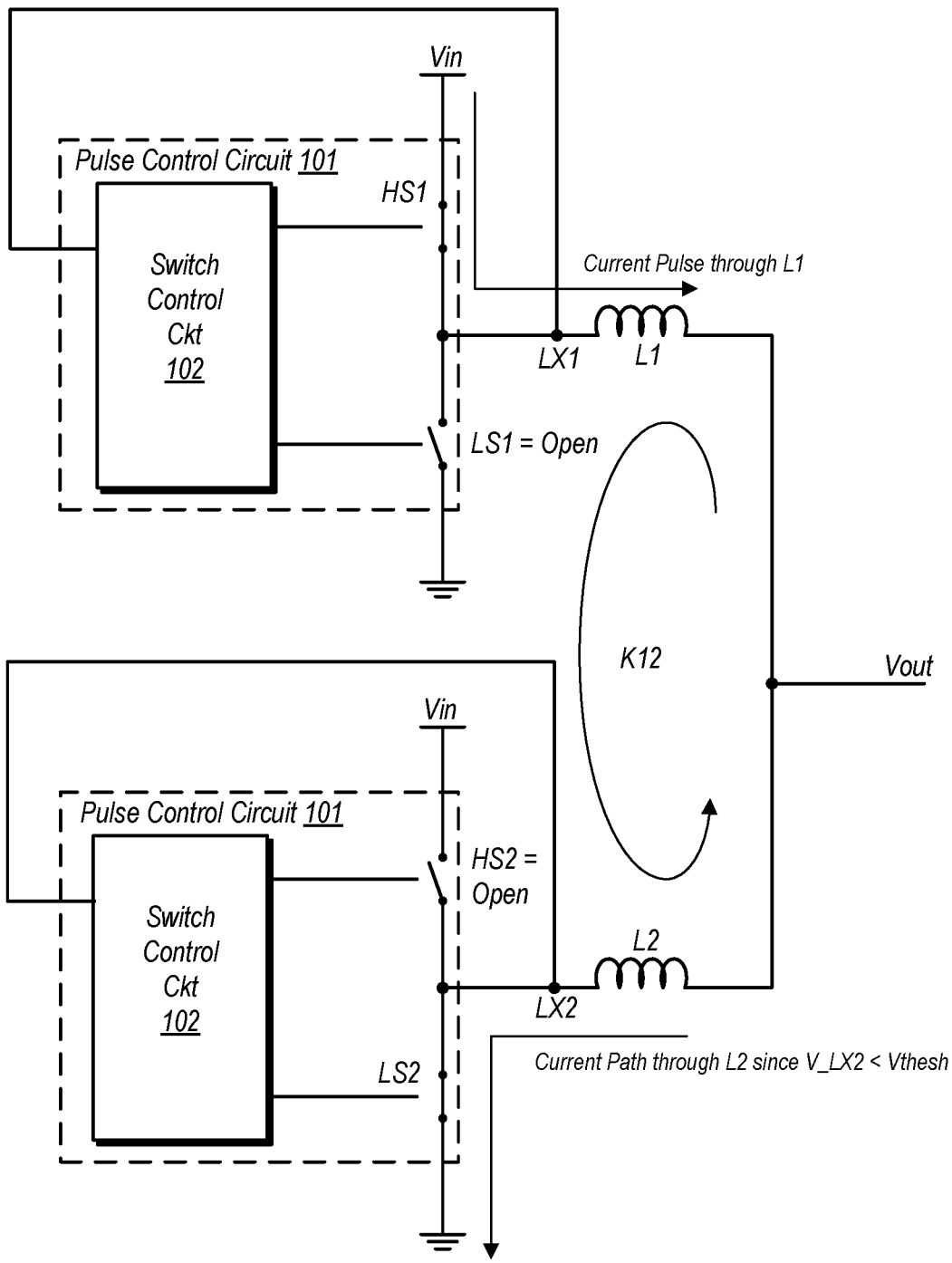
FIG. 4 illustrates operation of one embodiment of pulse control circuits of a coupled inductor pair in a first operating condition.

FIG. 4 illustrates operation of one embodiment of pulse control circuits of a coupled inductor pair in a first operating condition. In this example, the pulse control circuit 101 coupled to inductor L1 is sourcing a current pulse by closing its high side switch, HS1. Switch LS1 is open at this time. Meanwhile, the voltage on LX2, as detected by an LX detect circuit 225 implemented in the pulse control circuit 101 coupled to inductor L2, is determined to be less than a threshold voltage (e.g., V_LX2<V_thresh). In this condition, the low side switch LS2 is closed to activate a current path to ground through L2. This prevents the low side switch LS2 from acting as a diode.

Figure 5:
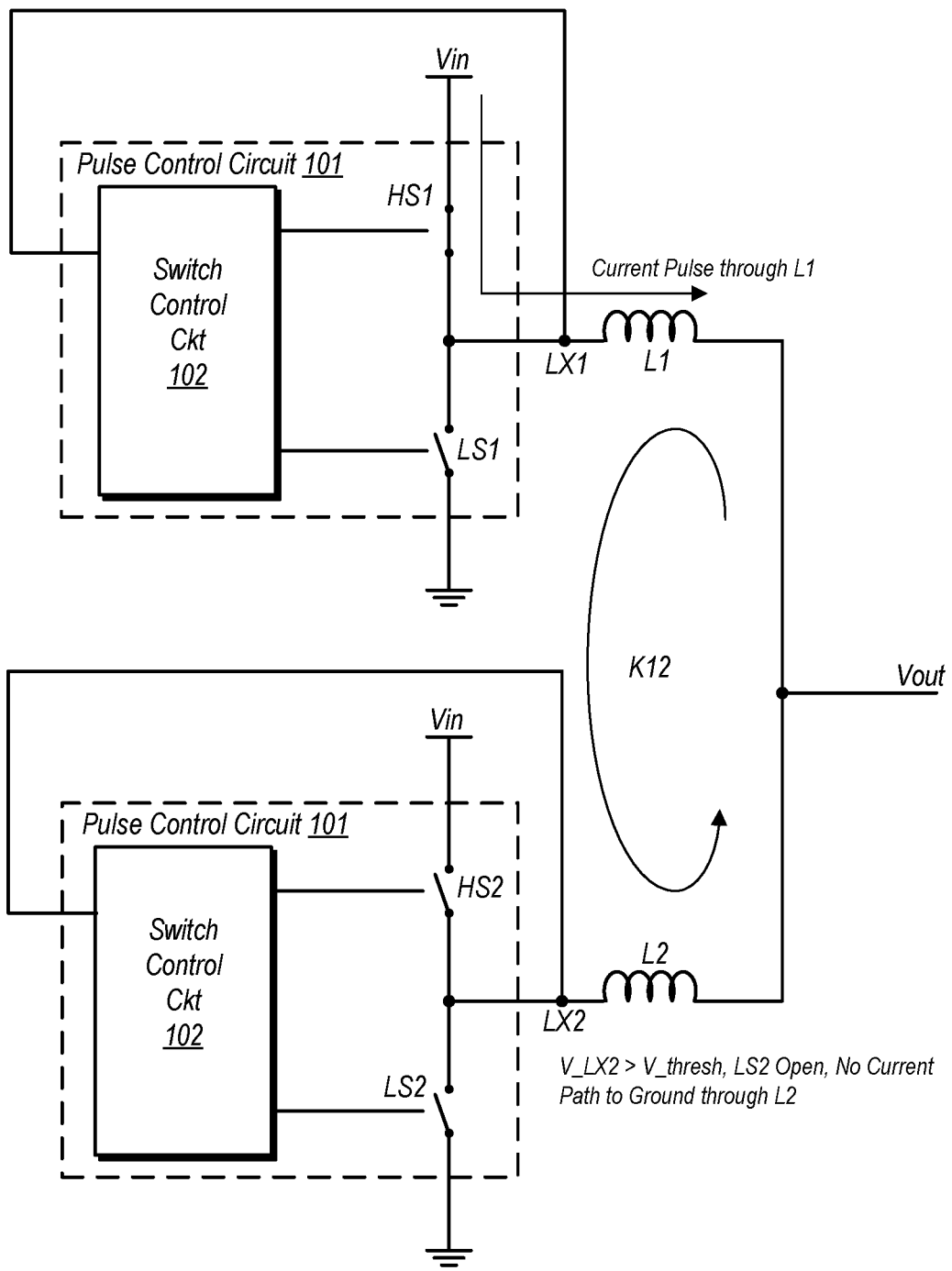
FIG. 5 illustrates operation of one embodiment of pulse control circuits of a coupled inductor pair in a second operating condition.

FIG. 5 illustrates operation of one embodiment of pulse control circuits of a coupled inductor pair in a second operating condition. As with the example of FIG. 4, a current pulse is being sourced through inductor L1 due to the activation of high side switch HS1 by the corresponding pulse control circuit 101. However, in this case the voltage on LX2 is greater than the threshold voltage (V_LX2>V_thresh). Accordingly, the low side switch LS2 is inactive (open), and thus no current path is provided through L2. Furthermore, since V_LX2>V_thresh, the low side switch does not act as a diode.

Figure 6:
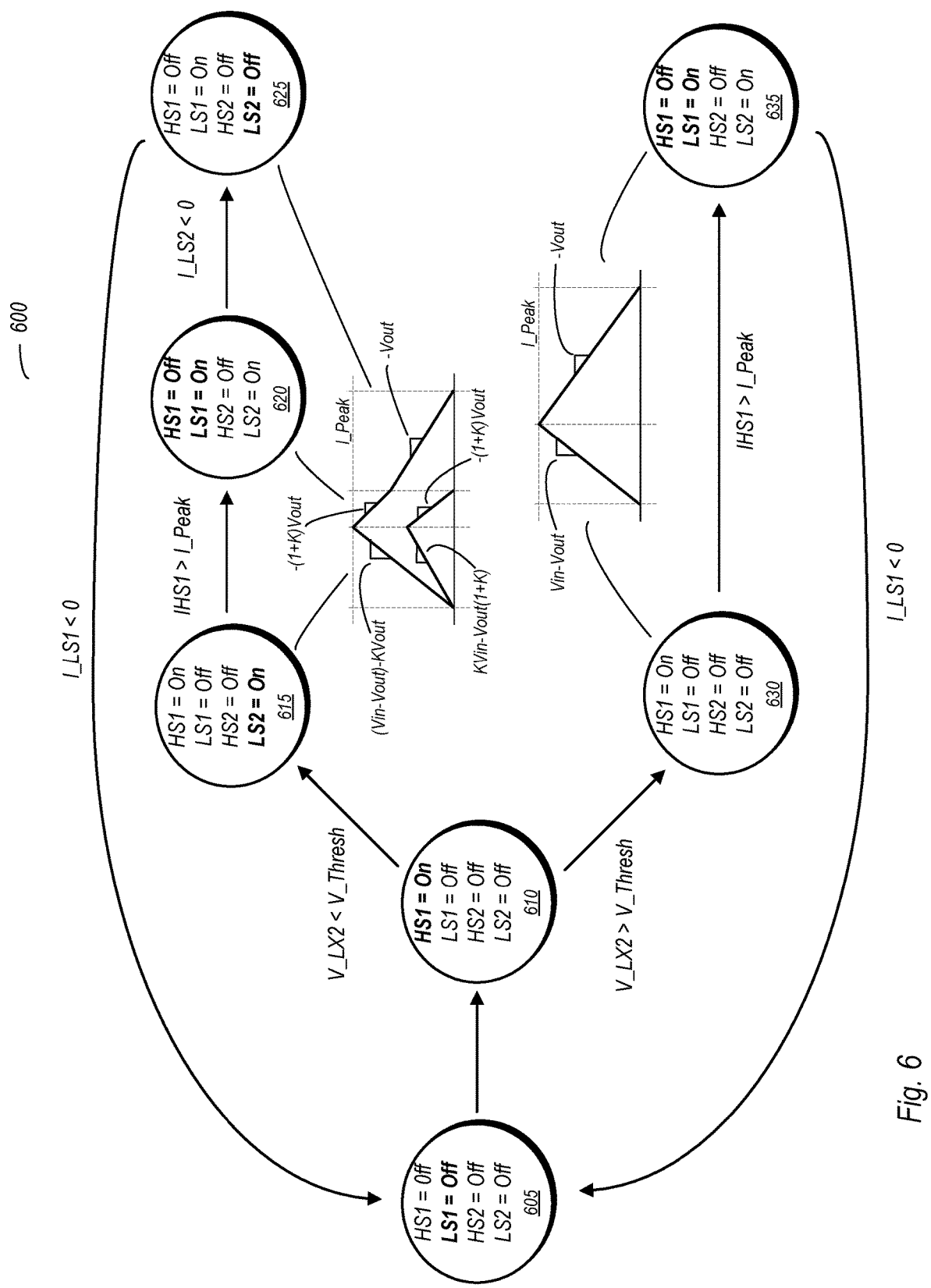
FIG. 6 is a state diagram illustrating operation of one embodiment of pulse control circuits of a coupled inductor pair in first and second operating conditions.

FIG. 6 is a state diagram illustrating operation of one embodiment of pulse control circuits of a coupled pair in first and second operating conditions. This state diagram assumes that a first pulse control circuit including high side and low side switches HS1 and LS1, respectively, is sourcing a current pulse through its corresponding inductor, which is a first inductor of a coupled pair. Meanwhile, a second pulse control circuit associated with a second inductor of the coupled pair and having high and low side switches HS2 and LS2, respectively, is monitoring a voltage LX2 to determine whether to activate its low side switch. This operation may be part of the rotating PFM mode operation discussed above, although it is possible and contemplated that such operation occurs in other modes (e.g., a PWM mode or a non-rotating PFM mode). In addition, FIG. 6 also graphically illustrates the currents flowing through the respective inductors.

It is noted that when the particular state of a given switch in a given state is listed in bold, it is representative of a change for that switch relative to the previous state. Furthermore, the term "off" as used here indicates that a switch is open, while the term "on" indicates that the switch is closed.

State diagram 600 begins at state 605, with HS1, LS1, HS2, and LS2 all being off. Thereafter, the flow progresses to state 610, where a current pulse is sourced through the first inductor by turning on HS1. At this point, the voltage level of V_LX2 is detected and compared to a threshold voltage, V_Thresh. When V_LX2<V_thresh, LS2 is turned on in state 615, with HS1 remaining on. Currents through both the first and second inductors begin rising, as indicated by the graphic illustration. In state 615, the current through the first inductor (through which the current pulse is being source) rises, with the slope of this rise expressed as (Vin−Vout)−KVout. Meanwhile, the current through the second inductor, due to the current path activated by turning on LS2, is KVin−Vout(1+K).

As the current through HS1 (and thus through the first inductor) passes its desired peak value (IHS1>I_Peak), the flow transitions to state 620, which HS1 being turned off and LS1 being turned on. The current through the first inductor then begins to decline, initially at a slope of −(1+K)Vout. The low side switch LS2 remains on, with the current through this device also falling at a slope of −(1+K)Vout. When the current through the low side switch LS2 falls below zero, the flow transitions to state 625, with the low side switch LS2 being turned off while the other low side switch, LS1, remains on. Subsequently, the current through the other low side switch falls at a slope of −Vout. When I_LS1 falls below zero, the flow transitions back to state 605, and LS1 is turned off.

If, at state 610, the voltage on LX2 is greater than the threshold (V_LX2>V_thresh), then the low side switch LS2 remains off at state 630. The current through the inductor through which the current pulse is source (and thus, through high side switch HS1) rises at a slope of Vin−Vout. Upon passing the peak current (IHS1>I_Peak), the flow transitions to state 635 in which high side switch HS1 is turned off and low side switch LS1 is turned on. Thereafter, the current falls with a slope of −Vout. When the current through the low side switch LS1 falls below zero (I_LS1<0), a transition back to state 605 occurs as LS1 is turned off.

FIG. 7 is a schematic diagram of a first embodiment of a voltage detection circuit. In the embodiment shown, LX detect circuit 225-A includes a resistor R coupled between a voltage input node, Vin (which may be the same voltage input node of the DC-DC converter), and an input to an inverter 270. The input do the inverter 270 is also coupled to a drain terminal of transistor N1. The gate terminal of transistor N1 in this embodiment is coupled to ground, while the source terminal is coupled to the LX voltage node of the corresponding pulse control circuit 101 in which it is implemented.

If the voltage on the node LX is positive, transistor N1 remains off. Accordingly, the input to inverter 270 is high, and the output signal therefrom, LS_On, is low. As such, a correspondingly coupled Off-time circuit (or other logic circuit) may inhibit activation of the corresponding low side switch. If the voltage on LX becomes sufficiently negative, the voltage difference between ground (coupled to the gate of N1) and the source of N1 may exceed the transistor threshold (turn-on) voltage. When this condition occurs, N1 may be activated and may pull the input to inverter 270 low. Responsive thereto, inverter 270 outputs LS_On as a high, which may cause a corresponding Off-time or other logic circuit to activate the low side switch of the pulse control circuit 101 in which LX detect circuit 225-A is implemented.

FIG. 8 is a schematic diagram of a second embodiment of a voltage detection circuit. In this embodiment, LX Detect circuit 225-B includes a current source, I_Source, coupled to the input voltage node at one terminal and a resistor R1 at the other. Resistor R1 is also coupled to the LX voltage node. Based on the voltage of LX and the current through I_Source, a voltage, V_thresh is generated across resistor R1. The junction of R1 and I_Source is coupled to one input of comparator 280. A second input of comparator 280 is coupled to resistor R2, which is coupled to ground at its other terminal.

During operation, comparator 280 compares the voltages on its two inputs. When the voltage on LX is at a sufficiently high value, the voltage on the non-inverting input of comparator 280 is less than the voltage on the inverting input. At this point, comparator 280 outputs the LS_On signal as a low. As the voltage on LX falls, the current through R1 increases. When the current through R1 increases, the voltage across this resistor also increases. When the voltage across R1 is greater than the voltage on the inverting input of comparator 280, LS_On is output as a high. This in turn may cause the corresponding pulse control circuit in which it is implemented to activate the low side switch.

Figure 9:
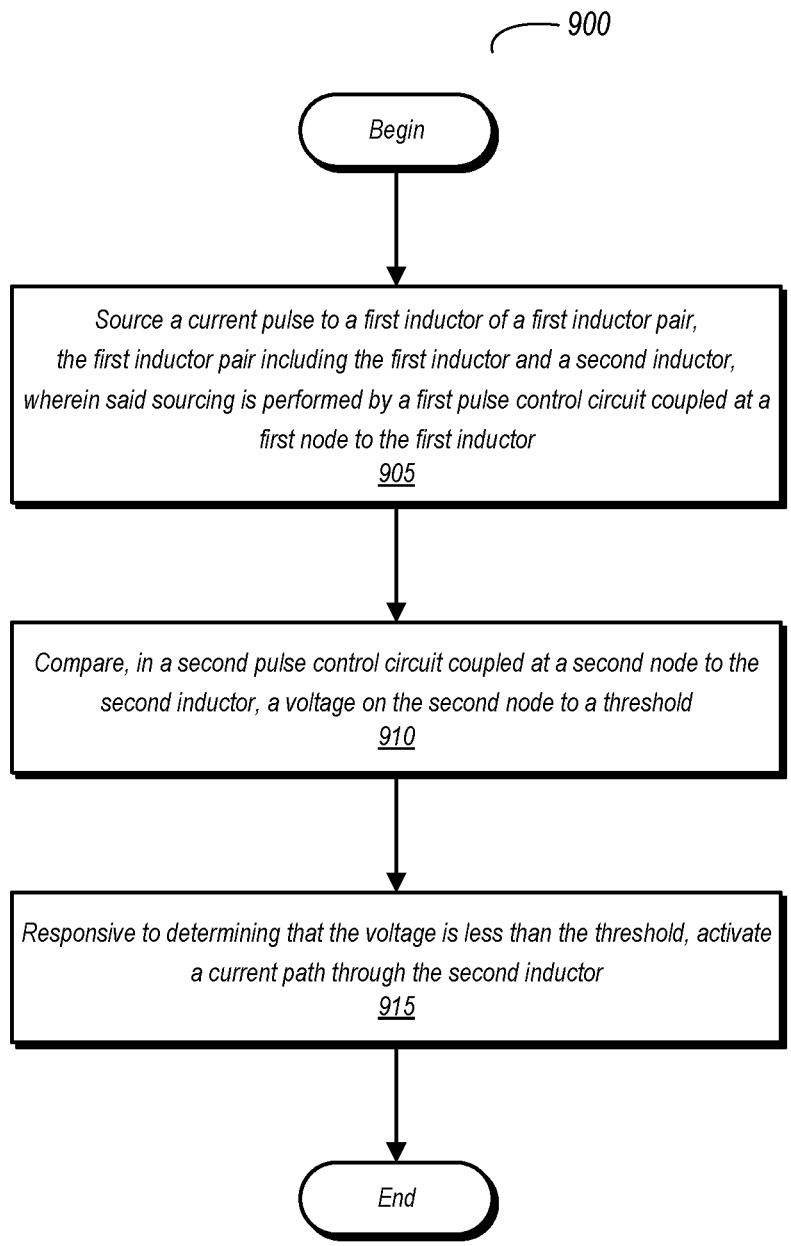
FIG. 9 is a flow diagram of one embodiment of a method illustrating operation of pulse control circuits of a coupled inductor pair in a DC-DC converter.

FIG. 9 is a flow diagram of one embodiment of a method illustrating operation of pulse control circuits of a coupled inductor pair in a DC-DC converter. Method 900 may be performed using various embodiments of the hardware/circuitry discussed above. Additional hardware/circuit embodiments may also be capable of carrying out Method 900, and may thus fall within the scope of this disclosure.

Method 900 includes sourcing a current pulse to a first inductor of a first inductor pair, the first inductor pair including the first inductor and a second inductor, wherein said sourcing is performed by a first pulse control circuit coupled at a first node to the first inductor (block 905). The method further includes comparing, in a second pulse control circuit coupled at a second node to the second inductor, a voltage on the second node to the second inductor to a threshold (block 910). Responsive to determining that the voltage is less than the threshold voltage, the method further includes activating a second current path through a second inductor (block 915).

In various embodiments, the method includes inhibiting the current path through the second inductor responsive to determining that the voltage is greater than the threshold. The threshold voltage may, in one embodiment, be a diode voltage across a transistor coupled to the second inductor at the second node. If the voltage goes negative during operation, it may effectively cause the transistor to operate as a diode, which is undesirable. Accordingly, turning on the second transistor may activate a current path to ground, thereby preventing the voltage on the second node from remaining negative while also preventing the transistor from undesirable operation as a diode.

In various embodiments, the method may include sourcing a first current pulse, using the first pulse control circuit, through the first inductor during a first phase, and sourcing a second current pulse, using the second pulse control circuit, through the second inductor, during a second phase, the second phase being opposite of the first phase.

In some embodiments, a DC-DC converter may include a plurality of inductors arranged in pairs of inductors. When current demand from a load circuit coupled to the DC-DC converter is low, the desired voltage may be maintained by providing less output current. Accordingly, at such times, the number of pulse control circuits that source current pulses in a given cycle may be reduced relative to times when current demand is high. Therefore, the method may include sourcing a current pulse through a selected one of a plurality of inductors using one of a plurality of pulse control circuits, the plurality of inductors including the first and second inductors, and the plurality of pulse control circuits including the first and second pulse control circuits while inhibiting other ones of the plurality of pulse control circuits from sourcing a current pulse during a cycle in which the selected one of the plurality of inductors is sourcing the current pulse. In a plurality of successive cycles, the method may include selecting, using a mode control circuit, which one of the plurality of pulse control circuits is to source a current pulse and which ones of the plurality of pulse control circuits are to be inhibited from sourcing a current pulse.

In various embodiment, each of the pulse control circuits is coupled to receive a feedback voltage. Accordingly, the method includes providing a feedback voltage to each of the plurality of pulse control circuits, wherein particular ones of the plurality pulse control circuits from sourcing a current pulse comprises providing an offset to the feedback voltage.

Each of the pulse control circuits includes a first switch coupled between a voltage input node and its respective output node (e.g., first node for first pulse control circuit, etc.), and a second switch coupled between its respective node and ground. Accordingly, the method may further include, for first and second pulse control circuits associated with respective inductors of a coupled pair, the first pulse control circuit activating a first switch to source the current pulse, the first switch being coupled between the first node and an input voltage node and the second pulse control circuit activating a second switch to activate the current path, the second switch being coupled between the second output node and a ground node.

Figure 10:
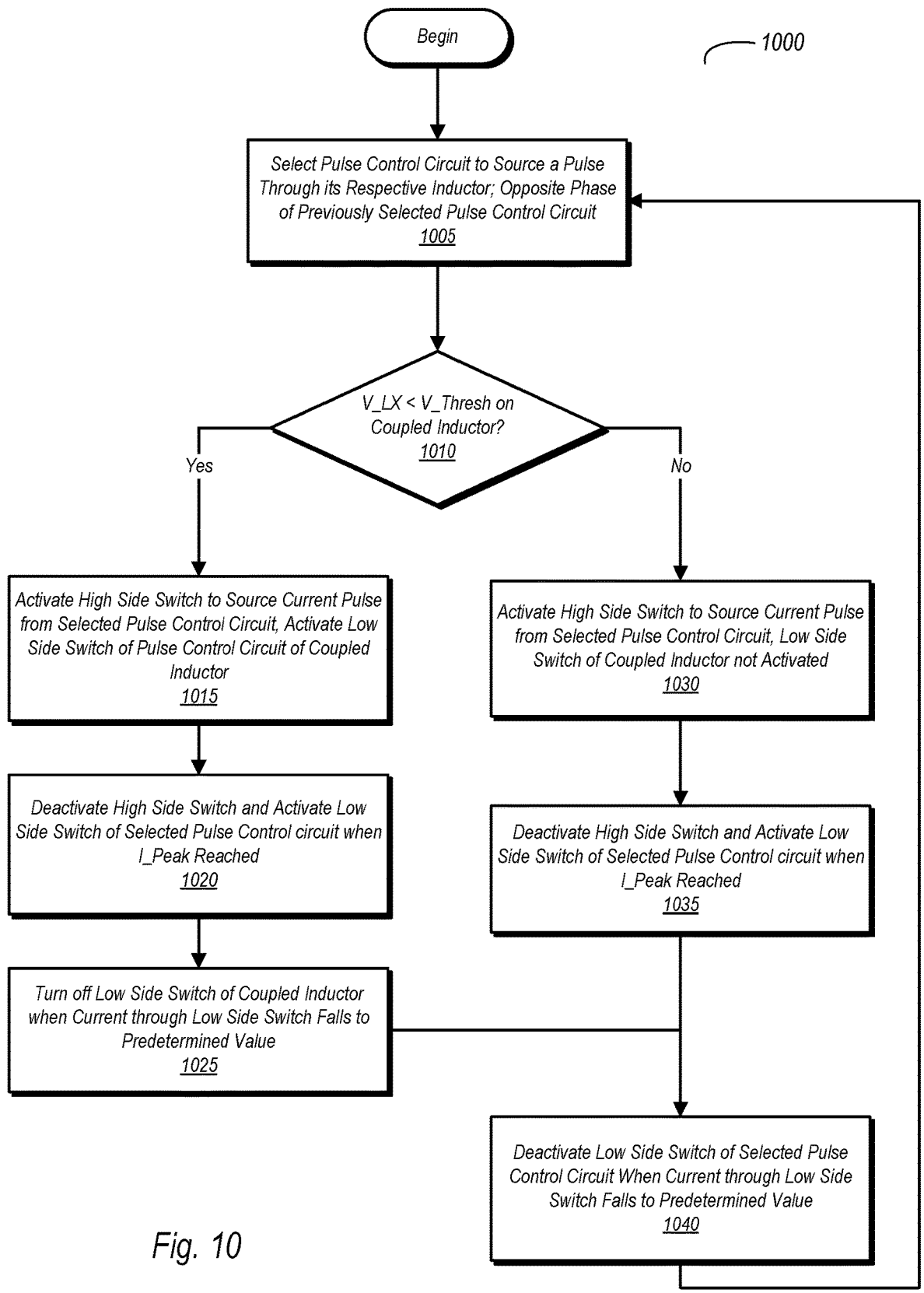
FIG. 10 is a flow diagram of one embodiment of a method for operating a DC-DC converter.

FIG. 10 is a flow diagram of one embodiment of a method for operating a DC-DC converter. As with Method 900, Method 1000 may be performed with various embodiments of the hardware/circuitry discussed above. Circuit/hardware embodiments capable of carrying out Method 1000 may also fall within the scope of this disclosure.

Method 1000 includes selecting a pulse control circuit to source a pulse through its respective inductor on a phase that is opposite of the phase of the previously selected pulse control circuit (block 1005). In general, for any given inductor pair, current pulses are sourced through the individual inductors on opposite phases. Accordingly, when a given pulse control circuit is sourcing a current pulse through its corresponding inductor, no current pulse is sourced through the other inductor of the pair by its corresponding pulse control circuit. For the purposes of discussing FIG. 10, the other inductor through which no current pulse is sourced is referred to as the coupled inductor.

The method includes comparing a voltage V_LX present on a node of the coupled inductor to a threshold voltage (the node is that which is coupled to the corresponding pulse control circuit). If the voltage present on a node of the coupled inductor, V_LX, is greater than a threshold (block 1010, yes), the method activates a high side switch to source the current pulse from the selected pulse control circuit, while also activating the low side switch of a pulse control circuit of the coupled inductor (block 1015). After a peak current, I_Peak is reached, the method proceeds with deactivating the high side switch and activating a low side switch of the selected pulse control circuit (block 1020). Thereafter, when the current through the low side switch of the pulse control circuit of the coupled inductor falls below a predetermined value, the low side switch is deactivated (block 1025). When the current through the low side switch of the selected pulse control circuit also falls to a predetermined value (which may be the same or different with respect to that associated with the other low side switch), the low side switch of the selected pulse control circuit is deactivated (block 1040) and the method returns to block 1005.

If the voltage V_LX is not less than the threshold value (block 1010, no), the high side switch of the selected pulse control circuit is activated to source a current pulse, but the low side switch of the pulse control circuit associated with the coupled inductor is not activated (block 1030). After a peak current, I_Peak is reached, the high side switch of the selected pulse control circuit is deactivated while its corresponding low side switch is activated (block 1035). When the current through the low side switch falls to a predetermined value, the low side switch is deactivated (block 1040) and the method returns to block 1005 and continues.

Figure 11:
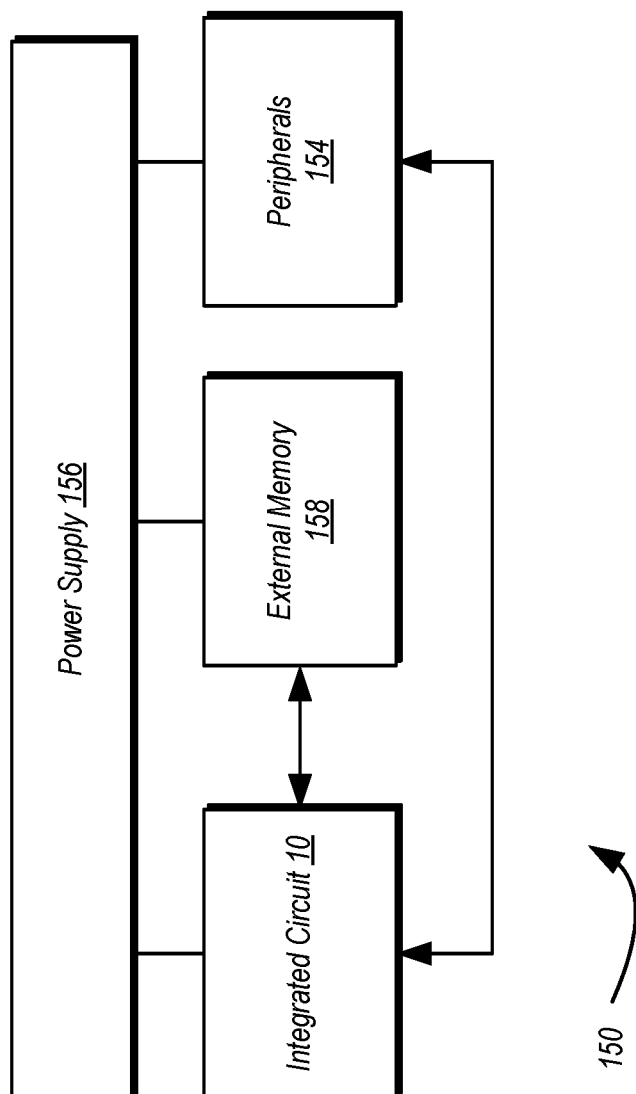
FIG. 11 is a block diagram of one embodiment of an example system.

Turning next to FIG. 11, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

In various embodiments, IC 10, peripherals 154 and/or memory 158 may include one or more instances of a DC-DC converter as discussed above. Such instances of a DC-DC converter may be used to provide a corresponding supply voltage to various circuits therein. These instances of a DC-DC converter may further receive an input voltage from power supply 156.

Numerous variations and modifications will become apparent to those skilled in the art once the above disclosure is fully appreciated. It is intended that the following claims be interpreted to embrace all such variations and modifications.

What is claimed is:

1. A circuit comprising:
   first and second inductors arranged to form a pair of coupled inductors in a DC-DC converter;
   a first pulse control circuit coupled to the first inductor, the first pulse control circuit including a first on-time circuit configured to cause current pulses to be sourced to the first inductor, a first off-time circuit configured to activate a current path between the first inductor and a ground node, and first and second switches coupled to the first inductor, wherein the first off-time circuit is coupled to receive, as inputs, an output from the first on-time circuit, an output from a first voltage detect circuit, and an output from a first current comparator; and a second pulse control circuit coupled to the second inductor; the second pulse control circuit including a second on-time circuit configured to cause current pulses to be sourced to the second inductor, a second off-time circuit configured to activate a current path between the second inductor and a ground node, and third and fourth switches coupled to the second inductor, wherein the second off-time circuit is coupled to receive, as inputs, an output from the second on-time circuit, an output from a second voltage detect circuit, and an output from a second current comparator;

wherein the first and second off-time circuits are configured to activate respective current paths between the first and second inductors and ground in response to de-assertion of the respectively coupled outputs from the first and second on-time circuits;

wherein, concurrent with the first pulse control circuit sourcing a current pulse through the first inductor, the second off-time circuit of the second pulse control circuit is configured to activate the current path through the second inductor responsive to the second voltage detect circuit determining that a voltage on an output node of the second pulse control circuit is less than a threshold.

2. The circuit of claim 1, wherein the first on-time circuit is configured to control the first switch and wherein the first off-time circuit is configured to control the second switch; and wherein the second on-time circuit is configured to control the third switch and wherein the second off-time circuit is configured to control the fourth switch.

3. The circuit of claim 2, wherein the second pulse control circuit is configured to source the current pulse by the second on-time circuit causing closing of the third switch, and wherein the first pulse control circuit is configured to activate a current path to ground through the first inductor by the first off-time circuit causing closing of the second switch responsive to determining that a voltage on an output node of the first pulse control circuit is less than the threshold.

4. The circuit of claim 2, wherein the second off-time circuit is configured to cause the fourth switch to remain open, responsive to determining that the voltage on the output node of the second pulse control circuit is greater than the threshold, when the first pulse control circuit is sourcing a current pulse.

5. The circuit of claim 1, wherein the first and second pulse control circuits are configured to source current pulses through their respectively coupled one of the first and second inductors in phases that are opposite of one another.

6. The circuit of claim 1, further comprising:
a plurality of inductors arranged in a plurality of pairs of coupled inductors, wherein the first and second inductors comprise a first one of the plurality of pairs of coupled inductors; and
a plurality of pulse control circuits each coupled to a corresponding one of the plurality of inductors, the plurality of pulse control circuits including the first and second pulse control circuits;
wherein a first subset of the plurality of pulse control circuits are configured to source current pulses through their respectively coupled one of the plurality of inductors during a first phase, and wherein a second subset of the plurality of pulse control circuits are configured to source current pulses through their respectively coupled one of the plurality of inductors during a second phase that is opposite of the first phase.

7. The circuit of claim 6, further comprising a mode control circuit, wherein the mode control circuit is configured to:
inhibit, during the first phase, each of a third subset of the plurality of pulse control circuits from sourcing current pulses through their respectively coupled one of the plurality of inductors, wherein the third subset is a subset of the first subset; and
inhibit, during the second phase, each of a fourth subset of the plurality of pulse control circuits from sourcing current pulses through their respectively coupled one of the plurality of inductors, wherein the fourth subset is a subset of the second subset.

8. The circuit of claim 6, further comprising a mode control circuit is configured to inhibit a selected one of the plurality of pulse control circuits from sourcing a current pulse through its respectively coupled one of the plurality of inductors by altering a feedback voltage provided to the selected one of the plurality of pulse control circuits.

9. The circuit of claim 8, further comprising a plurality of voltage offset circuits, wherein each of the voltage offset circuits is coupled in a feedback loop to a corresponding one of the plurality of pulse control circuits, and wherein the mode control circuit is configured to cause a given one of the plurality of pulse control circuits to inhibit sourcing a current pulse by causing its correspondingly coupled one of the plurality of voltage offset circuits to apply an offset voltage to an input coupled to receive the feedback voltage.

10. The circuit of claim 1, further comprising a voltage detection circuit coupled to the second off-time circuit, wherein the voltage detection circuit is configured to detect that the voltage on the output node of the second pulse control circuit is a negative voltage.

11. A method comprising:
sourcing a current pulse to a first inductor of a first coupled inductor pair, the first coupled inductor pair including the first inductor and a second inductor, wherein said sourcing is performed by activating a first switch using an on-time circuit in a first pulse control circuit coupled at a first node to the first inductor;
comparing, using a threshold detect circuit in a second pulse control circuit coupled at a second node to the second inductor, a voltage on the second node to a threshold;
responsive to the threshold detect circuit determining that the voltage is less than the threshold and concurrent with sourcing the current pulse, activating a current path, through the second inductor, to a ground node, wherein the activating is performed by an off-time circuit in the second pulse control circuit activating a second switch, wherein the off-time circuit is coupled to receive, as inputs, an output from the threshold detect circuit, an output from the on-time circuit, and an output from a current comparator; and
activating the second switch, using the off-time circuit in the second pulse control circuit, in response to an on-time circuit in the second pulse control circuit de-activating a third switch coupled between the second inductor and an input voltage source.

12. The method of claim 11, further comprising the off-time circuit holding the second switch inactive to inhibit the current path through the second inductor responsive to the threshold detect circuit determining that the voltage is greater than the threshold.

13. The method of claim 11, further comprising:
sourcing a first current pulse, using the first pulse control circuit, through the first inductor during a first phase; and
sourcing a second current pulse, using the second pulse control circuit, through the second inductor, during a second phase, the second phase being opposite of the first phase.

14. The method of claim 11, further comprising
sourcing a current pulse through a selected one of a plurality of inductors using one of a plurality of pulse control circuits, the plurality of inductors including the first and second inductors, and the plurality of pulse control circuits including the first and second pulse control circuits;
inhibiting other ones of the plurality of pulse control circuits from sourcing a current pulse during a cycle in which the selected one of the plurality of inductors is sourcing the current pulse; and
in a plurality of successive cycles, selecting, using a mode control circuit, which one of the plurality of pulse control circuits is to source a current pulse and which ones of the plurality of pulse control circuits are to be inhibited from sourcing a current pulse.

15. The method of claim 14, further comprising providing a feedback voltage to each of the plurality of pulse control circuits, wherein particular ones of the plurality of pulse control circuits from sourcing a current pulse comprises providing an offset to the feedback voltage.

16. An apparatus comprising:
a plurality of inductors forming a plurality of coupled inductor pairs, wherein ones of the plurality of coupled inductor pairs include respective first and second inductors, wherein the first and second inductors of ones of the plurality of coupled inductor pairs are arranged such that their respective magnetic fields are shared with one another; and
a plurality of pulse control circuits coupled to corresponding ones of the plurality of inductors, wherein ones of the plurality of pulse control circuits include an on-time circuit configured to control a first switch coupled between a corresponding one of the plurality of inductors and an input voltage node, and further include an off-time circuit configured to control a second switch coupled between the corresponding one of the plurality of inductor and a ground node, wherein the off-time circuit of a given one of the plurality of pulse control circuits is coupled to receive an output from its corresponding on-time circuit, an output from a corresponding voltage detect circuit, and an output from a current comparator configured to measure a current through the second switch;
wherein, for a given one of the plurality of coupled inductor pairs, concurrent with a correspondingly coupled one of the plurality of pulse control circuits is sourcing a current pulse through a corresponding first inductor, a the off-time circuit of a corresponding other one of the plurality of pulse control circuits coupled to a corresponding second inductor is configured close its second switch to activate a current path to ground through the second inductor responsive to determining that a voltage on an output node of the corresponding other one of the pulse control circuit is less than a threshold.

17. The apparatus of claim 16, wherein each of the plurality of inductors is coupled to an output voltage node, and wherein the apparatus comprises a DC-DC converter configured to provide, on the output voltage node, an output voltage that is less than an input voltage provided on the input voltage node.

18. The apparatus as recited in claim 16, further comprising a mode control circuit configured to, during each of a plurality of successive cycles, selectively inhibit one or more of the plurality of pulse control circuits from sourcing respective current pulses through respectively coupled ones of the plurality of inductors by applying an offset to respective feedback voltages received by each of the one or more of the plurality of pulse control circuits.

19. The apparatus as recited in claim 18, wherein, during a rotating pulse
frequency modulation (PFM) mode, the mode control circuit is configured to:
during a given one of a plurality of successive cycles, select one of the plurality of pulse control circuits to source a current pulse through its respectively coupled one of the plurality of inductor; and
during a next one of the plurality of successive cycles immediately following the given one of the plurality of successive cycles, select a different one of the plurality of pulse control circuits to source a current pulse;
wherein, over a number of cycles equal to a number of inductors of the plurality of pulse control circuits, the mode control circuit is configured to cause each of the plurality of pulse control circuits to source one current pulse.

20. The apparatus of claim 16, wherein ones of the plurality of pulse control circuits include a voltage detection circuit coupled to its corresponding off-time circuit, wherein the voltage detection circuit is configured to detect that that the voltage on an output node of the corresponding other one of the pulse control circuit is negative.

* * * * *